(12) United States Patent
Wanat

(10) Patent No.: US 7,081,265 B2
(45) Date of Patent: Jul. 25, 2006

(54) ICE CREAM MAKER

(75) Inventor: David J. Wanat, Meriden, CT (US)

(73) Assignee: Conair Corporation, Stamford, CT (US)

( * ) Notice: Subject to any disclaimer, the term of this patent is extended or adjusted under 35 U.S.C. 154(b) by 325 days.

(21) Appl. No.: 10/340,196

(22) Filed: Jan. 10, 2003

(65) Prior Publication Data

US 2003/0131736 A1    Jul. 17, 2003

Related U.S. Application Data

(60) Provisional application No. 60/347,277, filed on Jan. 11, 2002.

(51) Int. Cl.
*A23C 3/04* (2006.01)
(52) U.S. Cl. .................. 426/524; 99/452; 99/453; 99/455; 99/348; 426/249; 426/565; 426/660; 426/512; 366/144; 366/220; 366/221; 62/342
(58) Field of Classification Search .......... 426/249, 426/565, 660, 512, 524; 99/452, 453, 455, 99/348; 366/144, 220, 221; 62/342
See application file for complete search history.

(56) References Cited

U.S. PATENT DOCUMENTS

| | | | |
|---|---|---|---|
| 187,407 A | 2/1877 | O'Conner | |
| 2,850,268 A | 9/1958 | Miller et al. ................. | 259/119 |
| 4,089,367 A | 5/1978 | Wietzel et al. ................ | 165/91 |
| 4,189,241 A | 2/1980 | Baldacci ..................... | 366/245 |
| D254,972 S | 5/1980 | Rakocy et al. .............. | D15/82 |
| 4,674,886 A * | 6/1987 | Uesaka et al. ............. | 366/144 |
| 5,022,315 A | 6/1991 | Bertram et al. ............... | 99/348 |
| D323,513 S | 1/1992 | van Asten .................... | D15/82 |
| 6,121,593 A * | 9/2000 | Mansbery et al. .......... | 219/679 |

* cited by examiner

*Primary Examiner*—Milton I. Cano
*Assistant Examiner*—Sarah L. Kuhns
(74) *Attorney, Agent, or Firm*—Lawrence Cruz; Steve A. Garner

(57) ABSTRACT

A dual bowl ice cream maker and method for selectively driving one or two mixing bowls, each mixing bowl in a separate mixing compartment, without requiring manipulation of either mixing bowl.

19 Claims, 4 Drawing Sheets

ICE CREAM MAKER

This application claims the benefit of U.S. Provisional Application No. 60/347,277 filed Jan. 11, 2002.

BACKGROUND OF THE INVENTION

1. Field of the Invention

The present invention relates to an ice cream maker. More particularly, the present invention relates to a dual bowl ice cream maker having two mixing bowls.

2. Description of the Prior Art

In the prior art, there are known ice cream makers, including ice cream makers having at least two containers disposed in a common container that surrounds both of the at least two mixing bowls. Generally, a common objective in the prior art devices is to sufficiently cool, simultaneously, both of the bowls disposed in the common container.

However, operation of the prior art ice cream makers having a single, common mixing compartment for the containment of two mixing bowls requires that both of the mixing bowls are cooled, mixed, and operated in the same manner.

Therefore, there exists a need to provide an ice cream maker that can selectively engage one or two mixing bowls, with each mixing bowl in a separate mixing compartment.

SUMMARY OF THE INVENTION

It is an object of the present invention to provide an ice cream maker having dual, i.e., at least two, mixing bowls.

It is another object of the present invention to provide such an ice cream maker that selectively drives either one or both of the mixing bowls.

It is still another object of the present invention to provide such an ice cream maker that selectively drives one or both of the mixing bowls, without requiring manipulation of either mixing bowl.

It is yet another object of the present invention to provide an ice cream maker having two mixing bowls, with each mixing bowl in a separate mixing compartment.

Accordingly, the present invention encompasses a dual bowl ice cream maker and method for selectively driving one or two mixing bowls, with each mixing bowl in a separate mixing compartment and without requiring manipulation of either mixing bowl.

The above and other objects, advantages, and benefits of the present invention will be understood by reference to following detailed description and appended sheets of drawings.

DETAILED DESCRIPTION OF THE INVENTION

Figure 1:
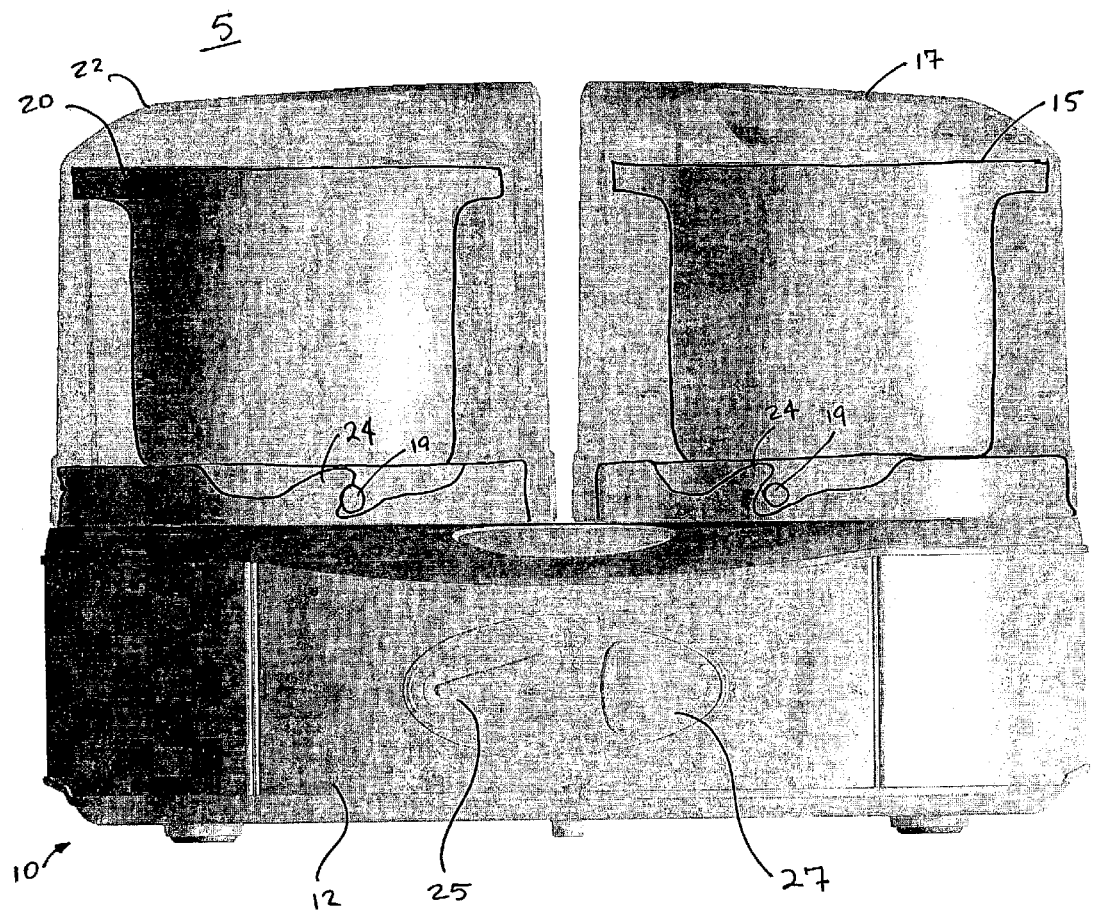
FIG. 1 is a front elevation view of an exemplary dual bowl ice cream maker in accordance with the present invention.

Referring to the drawings and in particular to FIG. 1, there is provided a dual bowl ice cream maker generally represented by reference numeral 5. The ice cream maker 5 has a base 10 including a housing 12, a first mixing bowl 15, and another or second mixing bowl 20. First mixing bowl 15 is covered by lid 17 and second mixing bowl 20 is covered by lid 22. Each of lids 17, 22 preferably has at least one stop, shown here as tab 19, located thereon for contacting mixing bowl support collar 24. Tab 19 and mixing bowl support collar 24 cooperate to prevent lids 17, 22 from when mixing bowls 15, 20, respectively, are rotating. Tab 19 and mixing bowl support collar 24 also cooperate to prevent lids 17, 22 from lifting up off or otherwise becoming separated from base 10 by positively holding lids 17, 19 in place when positioned as shown.

Tab 19 and mixing bowl support collar 24 preferably cooperate to lift lids 17, 22 from base 10 when the lid is rotated (e.g., manually) in a direction opposite the operational rotation of mixing bowls 15, 20.

Figure 2:
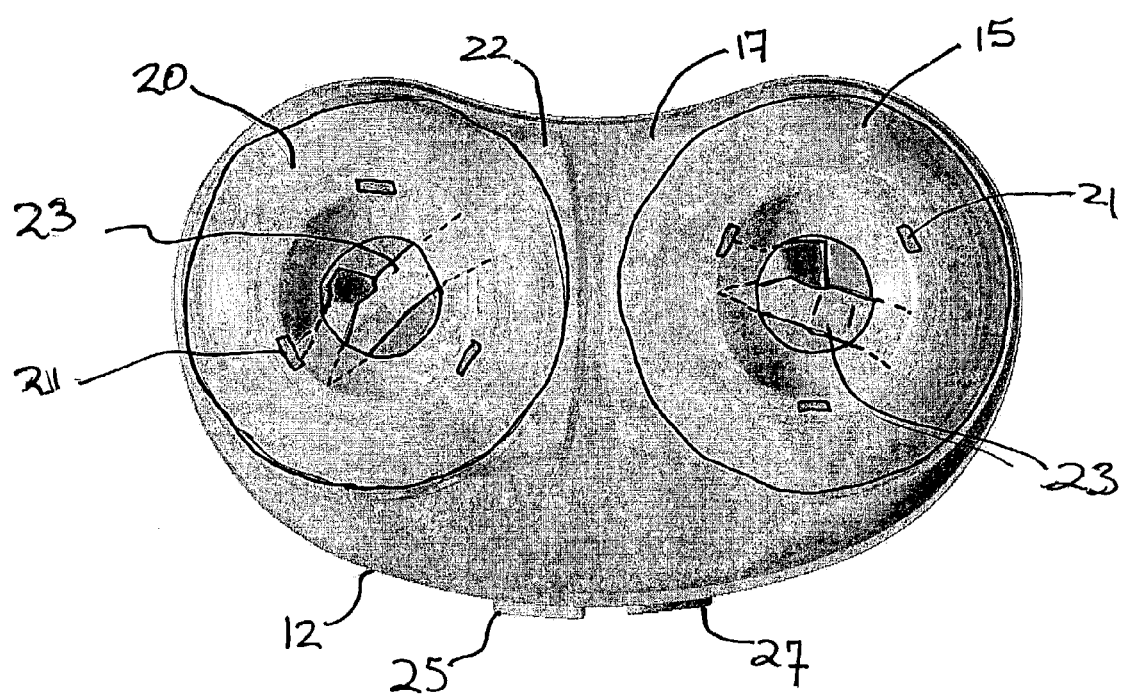
FIG. 2 is a top view of FIG. 1 in which the lids covering the mixing bowls and the scrapers disposed therein are shown.

FIG. 2 is a top view of ice cream maker 5. Exemplary lids 17, 22 each have an aperture in the top thereof for the purpose of, for example, introducing ingredients into mixing bowls 15, 20. Scrapers 23, preferably one in each of mixing bowls 15, 20, provide an ingredient agitating stirring/mixing action to the contents (e.g., ingredients) disposed in mixing bowls 15, 20.

When lids 17, 22 are placed over mixing bowls 15, 20 as shown in FIGS. 1 and 2, the lids act to contain the scrapers 23 in their respective mixing bowls. Lids 17, 22 preferably have members 21 connected, preferably affixed, to the underside thereof and extending, at least partially, down into mixing bowls 15, 20. Members 21 prevent scrapers 23 from rotating when mixing bowls 15, 20 are operationally rotated. In this manner, the rotating bowl and scrapers cooperate to effectuate a thorough mixing of the ingredients disposed in mixing bowls 15, 20.

Each of mixing bowls 15, 20 preferably has a double-wall construction and at least an inner surface made of a heat conductive material. A refrigerant is preferably deposited in the double wall construction of mixing bowls 15, 20. The refrigerant is cooled by, for example, placing the mixing bowls in a cool environment such as a freezer. It will be appreciated that the refrigerant is preferably resistant to actually freezing.

In accordance with well-known laws of thermodynamics, heat from ingredients placed in the cooled mixing bowls 15, 20 that is warmer than the refrigerant and thus the inner surface of the mixing bowls will be transferred to (i.e., absorbed by) the refrigerant. Accordingly, ingredients, such as those constituting ice cream, can be sufficiently cooled to form ice cream when placed and mixed in mixing bowls 15 and 20 previously cooled as discussed above.

In an aspect of the present invention, each of the mixing bowls 15, 20 are located in separate mixing compartments defined by lids 17, 22, respectively, and base 10. The individual, separate mixing compartments provide, inter alia, temperature and operation isolation between the two mixing bowls 15, 20.

In another aspect of the present invention, mixing bowls 15, 20 can be simultaneously rotated for operationally mixing ice cream ingredients therein. Alternatively, only one of the mixing bowls 15, 20 can be rotated. Selection of whether one or both of the mixing bowls 15, 20 are rotated is preferably controlled by a user and more preferably by an actuated switch. As depicted in the accompanying figures herewith, selection of one or two (i.e., dual) bowl rotation is controlled by bowl selector switch 25. Bowl selector switch 25 is preferably a lever as shown in FIG. 1. However, the particular implementation of the bowl selector switch 25 may vary to include, for example, a toggle switch, a membrane covered touch-sensitive micro-switch, or any switch or device that will actuate the selection of bowl rotation.

The power on and the power off are preferably controlled via a user actuated on/off switch such as, for example, on/off switch 27. On/off switch 27 is preferably a push button type switch that is sequentially depressed to alternate between a power on condition and a power off condition. Electrical energy for powering dual ice cream maker 5 of the present invention may be derived from a line source (e.g., AC) and/or a battery source.

It will be appreciated that the particular placement, size, and type of control switches may be varied without departing from the scope of the present invention and thus, are incorporated herein. For example, dual ice cream maker 5 of the present invention may include a remote control unit (not shown) that communicates with the dual ice cream maker via a wired or wireless communication link for controlling the functions of the dual ice cream maker. The functions controlled from the remote control unit may include, bowl selection operation (either single or dual) and power on/off.

It should be appreciated that other functions such as programmed mixing cycles, timed mixing cycles, etc. may be incorporated into dual ice cream maker 5 of the present invention. Such functionality may be controlled by any of the means or ways discussed in conjunction with the present dual ice cream maker 5 of the present invention.

Figure 3:
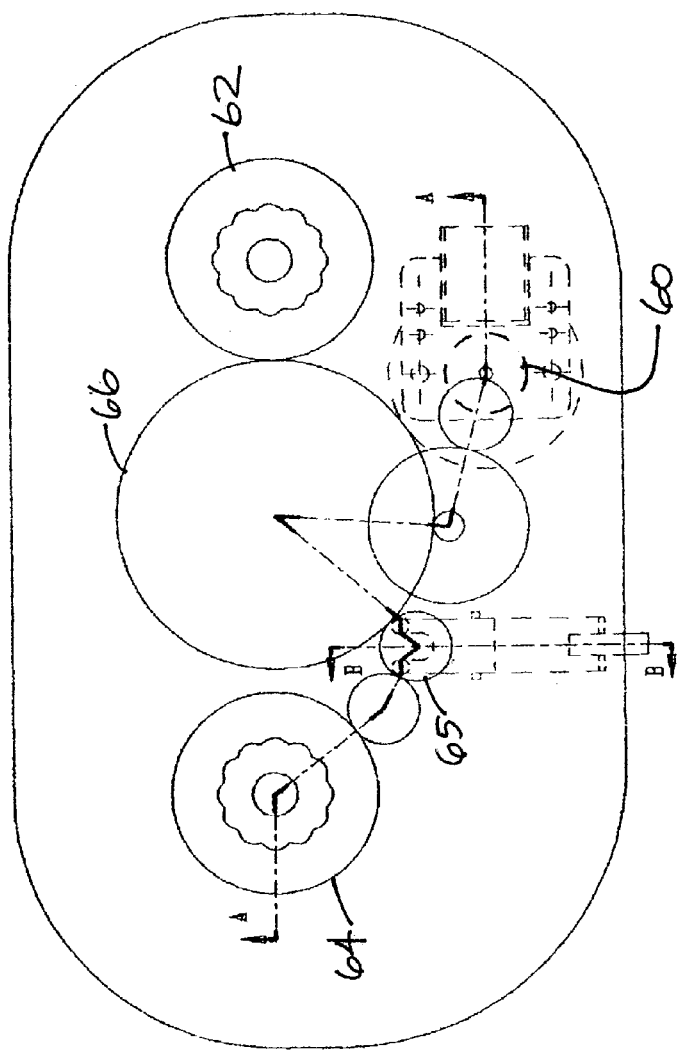
FIG. 3 is a schematic depiction of the drive gears of the dual bowl ice cream maker of FIG. 1.
Figure 4:
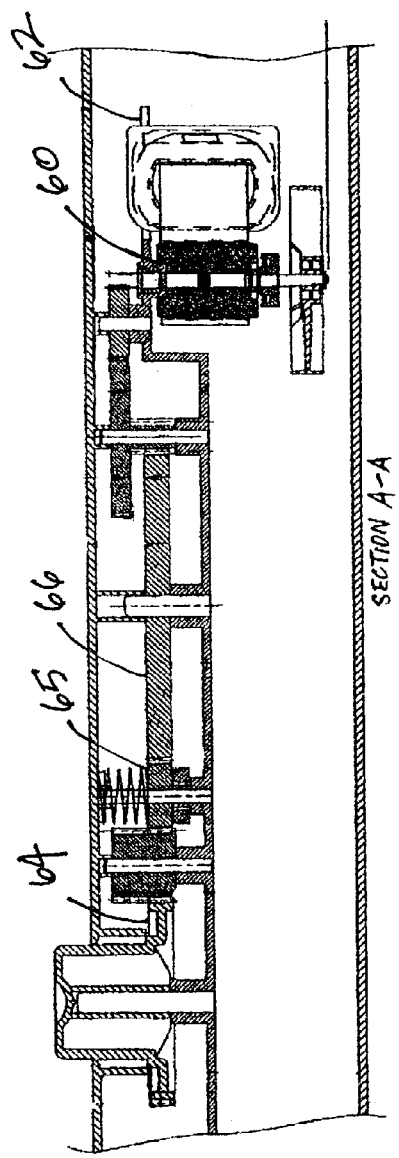
FIG. 4 is section view taken along line A—A of FIG. 3.

FIG. 3 provides an exemplary schematic depiction of a drive gear arrangement applicable for use with the dual bowl ice cream make of the present invention. In particular, motor 60 is energized to rotate gears 62 and 64 via the gear train configuration, including gears 65 and 66, as shown. FIG. 4 provides a side elevation of the gear configuration of FIG. 3.

Gear 65 can be selectively engaged and disengaged from the depicted gear drive train. Gear 65 is preferably selectively engaged and disengaged from the depicted gear drive train via bowl selector switch 25. With reference to FIGS. 3 and 4, it is seen that in the instance bowl selector switch 25 is selectively positioned for rotation of both mixing bowls 15 and 20, gear 65 is engaged in the gear drive train, thereby transferring rotational movement from motor 60 to both gear 64 and gear 62. Rotating gears 62 and 64 impart their rotational movement to first mixing bowl 15 and second mixing bowl 20 placed on base 10 of ice cream maker 5.

The first and second mixing bowls 15, 20 preferably have interfaces on a bottom surface thereof for coupling the mixing bowls to the rotating gears when placed on and supported by base 10.

In the instance bowl selector switch 25 is selectively positioned for rotation of a single mixing bowl, gear 65 is disengaged from the gear drive train and rotational movement is not transferred to gear 64, only gear 62. Consequently, a mixing bowl (e.g., 20) operationally rotated by gear 64 will not be rotated when bowl selector switch 25 is positioned for rotation of a single mixing bowl. With bowl selector switch 25 in this position, only gear 62 rotates and transfers rotational movement to one of the two mixing bowls (e.g., first mixing bowl 15) placed on base 10 of ice cream maker 5.

It should be appreciated that the gear configuration can be appropriately modified such that gear 62 is selectively rotated or not rotated by engagement and disengagement of gear 65 (and/or other gear(s)). Thus, such modifications are within the scope of the present invention.

Figure 5:
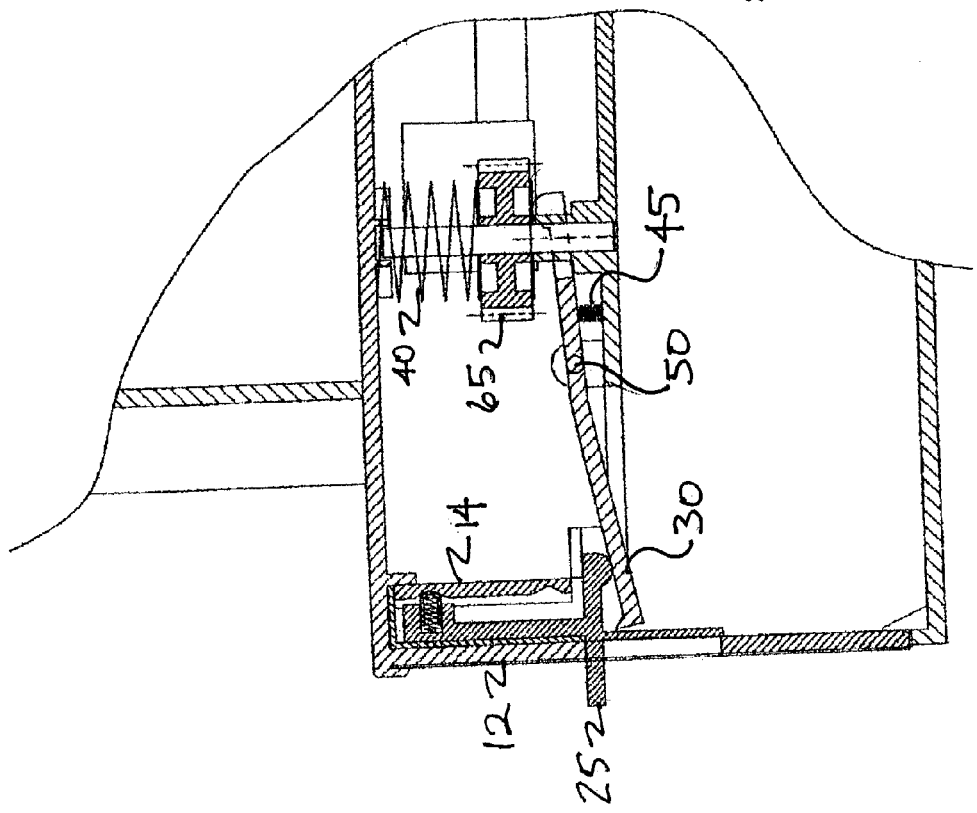
FIG. 5 is a section view taken along line B—B of FIG. 3 in which both mixing bowls are engaged for rotational mixing in accordance with the present invention.

FIG. 5 illustrates an aspect of the present invention, namely the engagement and disengagement of gear 65 from the gear drive train discussed above. In particular, FIG. 5 depicts, in detail, the positioning of bowl selector switch 25 of dual bowl ice cream maker 5 such that drive gear 65 is engaged. That is, bowl selector switch 25 is positioned for operational rotation of both bowls. Gear 65 is in a lowered position, thereby placing gear 65 in the gear drive train. Spring 40 downwardly biases gear 65 and arm 30. Arm 30 pivots about pivot 50 and contacts spring 45. Housing wall 14 preferably has indentations located thereon and cooperating with bowl selector switch 25 for positively selecting one or two (i.e., dual) bowl operational rotation.

Figure 6:
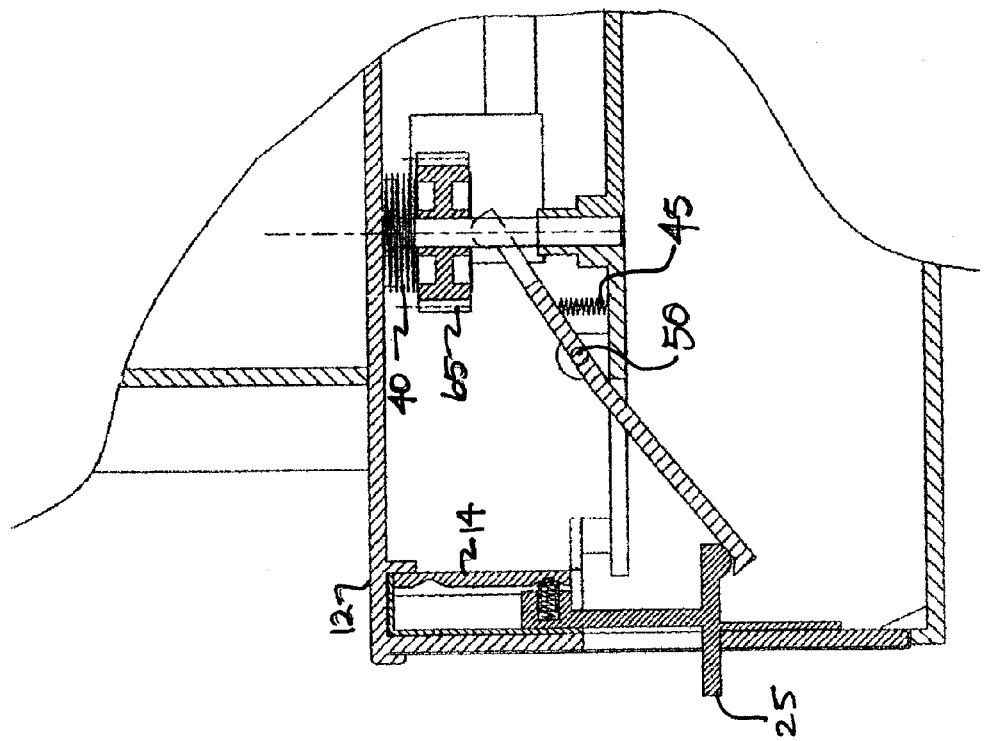
FIG. 6 is a section view taken along line B—B of FIG. 3 in which one mixing bowl is disengaged from rotational mixing in accordance with the present invention.

FIG. 6 illustrates, in detail, the positioning of bowl selector switch 25 of dual bowl ice cream maker 5 such that drive gear 65 disengaged from the gear drive train. Thus, dual bowl ice cream maker 5 can operationally rotate of one mixing bowl (e.g., mixing bowl 20). In this configuration, gear 65 is in a raised position, thereby removing the gear from the gear drive train, so that bowl selector switch 25 is positioned in a lowered position for operational rotation of a single mixing bowl. In the lowered position, bowl selector switch 25 forces one end of arm 30 down as shown. Arm 30 is pivoted and the end of the arm in contact with gear 65 forces the gear upward and compresses spring 40. As a result, gear 65 is disengaged from the gear drive train.

In the manner described above, dual bowl ice cream maker 5 of the present invention can selectively drive one or two mixing bowls, without requiring direct manipulation of either mixing bowl. Thus, one mixing bowl can be removed from base 10 without disturbing the other mixing bowl. Also, two different flavors of ice cream may be mixed, each in its own mixing bowl. In the event that the two flavors freeze at different rates when mixed, rotational mixing of the faster freezing flavor can be selectively discontinued upon completion of the freezing process without the need to manipulate the bowls or interrupt rotational mixing of the other mixing bowl containing the other flavor. Furthermore, neither the lids 17, 22 nor mixing bowls 15, 20 need be exposed to ambient (i.e., warm) air to effectuate selectively driving one or two mixing bowls.

It should also be appreciated by those skilled in the art that the particular ice cream maker functions and other aspects of the teachings herein are but examples of the present invention. Thus, they do not limit the scope or variety of applications that the present invention may be suitably implemented. Thus, it should be understood that the foregoing description is only illustrative of a present implementation of the teachings herein. Various alternatives and modification may be devised by those skilled in the art without departing from the present invention. Accordingly, the present invention is intended to embrace all such alternatives, modifications, and variances that fall within the scope of the disclosure herein.

What we claim is:

1. An ice cream maker, said ice cream maker comprising:
   a first mixing bowl for containing ingredients;
   a second mixing bowl for containing ingredients;
   a base unit supporting said first and second mixing bowls placed thereon;
   a motor for driving a driving mechanism to rotate said first and second mixing bowls; and
   a bowl selector switch for selectively engaging said driving mechanism to select between a) rotation of one of said first and second mixing bowls, and b) simultaneous rotation of said first and said second mixing bowl, without requiring manipulation of either said first bowl or said second bowl.

2. The ice cream maker of claim 1, further comprising:
a first lid for covering said first mixing bowl; and
a second lid for covering said second mixing bowl, wherein said first and second lids isolate said first and second mixing bowls, respectively, from each other.

3. The ice cream maker of claim 2, wherein said first and second lids each include an aperture therein for introducing the ingredients into said first and second mixing bowls, respectively.

4. The ice cream maker of claim 2, wherein said first and second lids thermally isolate said first and second mixing bowls from each other.

5. The ice cream maker of claim 1, wherein said switch is selected from the group consisting of a lever, a toggle switch, a push-button, a rocker switch, a touch-sensitive micro switch, and any combinations thereof.

6. The ice cream maker of claim 1, wherein the ingredients contained in said first mixing bowl differ from the ingredients contained in said second mixing bowl.

7. The ice cream maker of claim 1, wherein the ingredients contained in said first mixing bowl freeze at a different rate than the ingredients contained in said second mixing bowl.

8. The ice cream maker of claim 1, further comprising a remote control unit for communicating with said ice cream maker via a wired or wireless communication link for controlling a function of said ice cream maker.

9. The ice cream maker of claim 8, wherein said function is selected from the group consisting of single bowl rotation, dual bowl rotation, power on/off, and any combinations thereof.

10. A method of operating an ice cream maker having a first mixing bowl and a second mixing bowl for containing ingredients, said method comprising:
disposing said first and second mixing bowls on a base unit;
introducing ingredients into said first mixing bowl and said second mixing bowl;
activating a motor for driving a driving mechanism to rotate said first and second mixing bowls; and
selectively engaging said driving mechanism to select between a) rotation of one of said first and second mixing bowls, and b) simultaneous rotation of said first and said second mixing bowl, without manipulating either said first bowl or said second bowl,
wherein said rotation operates to mix ingredients in said first and second mixing bowls.

11. The method of claim 10, wherein said selectively controlling is implemented by a switch.

12. The method of claim 10, wherein the ingredients introduced into said first mixing bowl differ from the ingredients introduced into said second mixing bowl.

13. The method of claim 10, wherein the ingredients introduced into said first mixing bowl freeze at a different rate than the ingredients introduced into said second mixing bowl.

14. The method of claim 10, further comprising:
covering said first mixing bowl with a first lid; and
covering said second mixing bowl with a second lid, wherein said first and second lids isolate said first and second mixing bowls, respectively, from each other.

15. The method of claim 14, further comprising introducing ingredients into said first and second mixing bowls via an aperture disposed in each of said first and second lids, respectively.

16. The method of claim 14, wherein said first and second lids thermally isolate said first and second mixing bowls from each other.

17. The method of claim 10, further comprising cooling said first and second mixing bowls to a temperature sufficient to cool ingredients placed therein.

18. The method of claim 10, further comprising controlling a function of said ice cream maker by a remote control unit that communicates with said ice cream maker via a wired or wireless communication link.

19. The method of claim 18, wherein said function is selected from the group consisting of: single or dual bowl rotation, power on/off, and a combination thereof.

* * * * *